United States Patent [19]

Goodrich et al.

[11] Patent Number: 5,275,666
[45] Date of Patent: Jan. 4, 1994

[54] AUXILIARY APPARATUS FOR PRODUCING MAPLE SYRUP

[75] Inventors: Glenn A. Goodrich, West Danville; James A. Gaudette, St. Albans, both of Vt.

[73] Assignee: Leader Evaporator Company, Inc., St. Albans, Vt.

[21] Appl. No.: 943,231

[22] Filed: Sep. 10, 1992

[51] Int. Cl.⁵ .......................... C13F 1/00; B01D 9/00; B01D 1/04

[52] U.S. Cl. .......................... 127/9; 127/11; 127/16; 159/37; 159/40

[58] Field of Search .................. 127/9, 16, 11; 159/37, 159/40

[56] References Cited

U.S. PATENT DOCUMENTS

| | | | |
|---|---|---|---|
| 30,443 | 10/1860 | Ames | 159/37 |
| 36,881 | 11/1862 | Gates | 159/37 |
| 139,625 | 6/1873 | Storer | 159/37 |
| 264,701 | 9/1882 | Johnson | 159/33 |
| 4,953,538 | 9/1990 | Richardson et al. | 127/9 |

Primary Examiner—R. Bruce Breneman
Assistant Examiner—Patricia L. Hailey
Attorney, Agent, or Firm—Chapin, Neal & Dempsey

[57] ABSTRACT

An auxiliary apparatus for producing maple syrup from maple sap is adapted to utilize the latent heat of the steam emitted from the flue pan of a maple syrup evaporator which is fitted in sealed relation on top of the flue pan. The auxiliary apparatus is in the form of an upwardly opening pan with upright side walls and a bottom wall having a triangularly grooved inner surface and a correspondingly ridged outer surface. Steam pipes "open" at both ends thereof, extend through the interior of the auxiliary pan from a steam receiving chamber of the auxiliary pan to an upwardly opening exhaust chamber at the opposite end of the pan so that a substantial portion of the steam from the flue pan will flow through the sap in the auxiliary pan to heat the maple sap disposed therein to reduce the water content of the sap utilizing the latent heat from the flue pan. A plurality of air pipes also extend through the evaporator in parallel and closely adjacent relation to and below the steam pipes. Disposed in spaced-relation under each of the truncated lower portions of the evaporator are condensate drain pans oriented to provide for the collection and drip-off into a drain trough of steam which condenses on the obliquely angled concave underside of the evaporator.

3 Claims, 1 Drawing Sheet

AUXILIARY APPARATUS FOR PRODUCING MAPLE SYRUP

This invention relates to an improved apparatus for producing maple syrup from maple sap which requires evaporation of approximately 35 to 50 gallons of sap to yield one gallon of syrup and, more particularly, to an auxiliary apparatus which operates more efficiently than equipment heretofore available for this purpose.

BACKGROUND OF THE INVENTION

U.S. Pat. No. 4,953,538 dated May 29, 1987 discloses a "piggy back" evaporator which is constructed to "increase evaporation through the utilization of waste heat." The piggy back pan has a closely corrugated bottom panel, includes a sealed exhaust hood with an exhaust pipe and a blower which supplies air under pressure to a plenum 44 connected to a plurality of down pipes 48. Each down pipe is, in turn, connected to an elongated pipe for supplying compressed air into each grooved portion of the corrugated piggy back pan. An inclined collector sheet extends substantially across the entire area of the piggy back pan to receive and collect the steam condensate which in the form of water droplets falls onto the upper surface of the collector sheet and runs downwardly on the sheet into a drain trough. This collector sheet construction impedes the direct upward flow of steam emitted from the flue pan and since it cannot rise vertically to contact the underside of the piggy back pan, the steam follows a more circuitous route about the lower end of the collector sheet, as illustrated in FIG. 3. Consequently, some steam will condense on the underside of the collector sheet and a portion will condense on the upper surface of the collector sheet where the steam is flowing upwardly counter to the direction of the condensate run-off on the upper surface of the collector sheet. This arrangement results in two distinct disadvantages. First, a substantial portion of the condensate will drain back into the flue pan which, in essence, defeats the basic purpose of the apparatus, i.e., to reduce the water content of the maple sap. Secondly, as the steam flows over the upper side of the collector sheet, it is cooled by the counter flowing condensate which thereby reduces the amount of latent heat transferred from the steam to the sap and accordingly reduces the efficiency of the apparatus.

It is the principal object of this invention to provide an auxiliary evaporator pan disposed in superposed relation on the flue pan of conventional construction such that it is operable at higher efficiencies than conventional flue pans and which can be manufactured at lower cost than the piggy-back pan of the prior art.

The above and other objects and advantages of this invention will be more readily apparent from a reading of the following description taken in conjunction with the following drawings in which:

Figure 1:
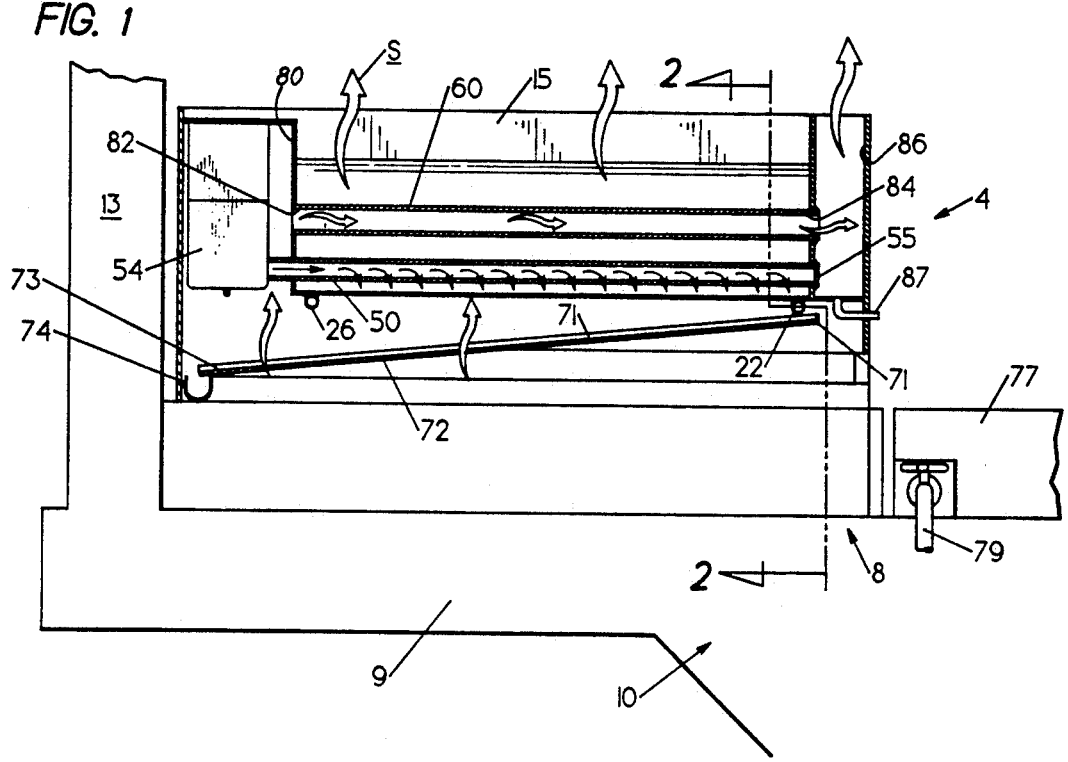
FIG. 1 is a side elevational view partly in section of an apparatus of the type embodying this invention.

Referring now to the detail of the drawings in FIG. 1 is shown generally at 4, a maple syrup producing auxiliary apparatus in combination with a flue pan 8 disposed upon the upper surface of the evaporator arch portion 9 of a fire box 10 capable of burning wood, coal or oil. The arch portion 9 of the fire box 10 is connected to a flue 13 which extends upwardly from the arch to vent the gases of the combustion process. The flue pan 8 may be of conventional construction, includes a closely corrugated bottom wall with concave "flue" portions which open downwardly and at their ends to receive the combustion gases flowing along the upper portion of the evaporator arch and through the concave flue portions of the flue pan to heat the sap 3 in the flue pan 8. The gases are exhausted into a stack or flue 13. The hot gases will cause rapid heating of the maple sap disposed within the corrugated flue pan and, as well known to those skilled in the art, many gallons of water must be boiled off in the form of steam to produce even one gallon of syrup. The steam S will rise vertically from the sap and, in conventional systems, is allowed to escape into the atmosphere.

In accordance with this invention, a second stage or auxiliary evaporator in the form of a pan 12 is provided in superposed and sealed relation on the upper edges of the flue pan 8 to utilize more fully the latent heat of the steam emitted from the flue pan in the "sugaring" process.

The auxiliary evaporator comprises a generally rectangular pan 12 with upright side walls 15 and an alternately ridged and grooved bottom panel 16. The bottom panel 16 joins walls 15 by a weld or other conventional means as shown at 19. The underside of the bottom panel 16 comprises concave grooves 32 of triangular cross-section and truncated ridge portions 17. The upper side of panel 16 is the inverse of the underside and comprises concave chambers 42 which extend the full length of the auxiliary pan 12, each of which is defined by triangularly oriented side walls and horizontal bottom walls 17. A plurality of relatively narrow drip pans 70 are disposed in laterally spaced relation under the generally horizontal, truncated portions 17 of the bottom panel 16. The drip pans are disposed to catch condensate which drips from the undersurface of the bottom of the pan 12. Within the upper pan 12, are a plurality of inverted truncated triangular heat exchange chambers 42 which extend in parallel and spaced relation across the width of the pan 12 and each of which is adapted to receive and retain maple sap for heating by the steam indicated by arrows S being emitted from the maple sap being heated in the lower flue pan 8.

Disposed within each chamber 42 of the auxiliary evaporator, is one or more perforated pipes 50 for supplying pressurized air to agitate the sap in the heat exchange chamber 42 for improved heat transfer. In addition, each chamber includes a plurality of steam pipes 60 disposed in adjacent relation and slightly above the air pipes 50. The steam pipes 60 also extend along generally the full length of the pan 12 and are "open" at both ends to enable steam rising from the sap in the flue pan to flow through the pipes 60. A chamber 80, "open" only at the lower end thereof, receives the rising steam which flows into openings 82 at one end of each of the pipes 60, through the pipes 60 and out openings 84 to an upwardly vented chamber 86 at the opposite end of the pan 12. A drain 87 is provided for the discharge of condensate resulting from the steam which flows through pipes 60 that are slightly tilted downward from chamber 80 to chamber 86. With this arrangement, a substantial portion of the steam from the flue pan will flow through the pipes 60 so that maple sap in each chamber 42 will be heated, not only by steam which impinges upon the under surface of the pan 12, but also by steam flowing within the pipes 60 which are immersed in the sap disposed in chambers 42.

As shown in FIG. 1, each of the pipes 50 is connected at one end thereof to manifold 54 and the opposite end of each pipe is closed or plugged, as shown at 55. The underside of each pipe 50 is perforated with a series of closely spaced holes so that air supplied by a blower, (not shown) connected to the manifold 54, will rise to agitate vigorously and froth the sap disposed in each chamber 42. The manifold 54 being disposed within the chamber 80 will preheat the air being supplied into the pipes 50 for additional efficiency of the system. The combination of the vigorously agitated sap in contact with the hot outer surfaces of the steam pipe 60 will cause a rapid heat transfer from the steam to the sap. In similar fashion, the steam contacting the undersurface of the bottom panel 16 will also result in the rapid heat transfer from the steam to the sap. This combination of preheating the air used to agitate the sap and simultaneously heating sap with chambers 42 as well as with steam pipes, provides for high efficiency in the transfer of the latent heat from the steam to the sap. Indeed, the auxiliary evaporator of the invention in conjunction with a conventional flue pan has been shown to increase efficiency by approximately 50%–70% over that obtainable by conventional flue pan evaporators alone.

The three upwardly open condensate drip pans 70, as shown, are relatively narrow and laterally spaced apart a substantial distance so that in totality they only span approximately 30% of the horizontal area between the flue pan and the auxiliary pan so that approximately 70% of that area is "open" for the free and unimpeded flow of steam from the flue pan to the upper pan 12. The pans may be secured in place in any convenient manner and, in the embodiment shown, are fastened, such as by welding, to the underside of a transversely disposed sap supply pipe 22. The pans 70 include upright back and side walls 71 and the pans are inclined downwardly as at 72 from their "closed" ends 71 to their "open" ends 73. The open ends 73 are positioned to discharge the condensate into a drain trough 74 inclined to provide for the drain-off of all the water outside the auxiliary pan.

Unlike the bottom of the flue pan 8 which is vertically corrugated, the bottom of the auxiliary pan 12 has a ridged pattern of triangular configuration in which the undersurface of the bottom panel 16 is disposed at an angle of about 45 degrees. It has been found that this is the optimum angle for causing the condensate to flow downwardly over the undersurface of the panel 16 toward the drain pans 70 with minimum dripping from the surface 16 outwardly of the pans 70. Similarly, the geometric configuration of the auxiliary pan 12 provides for maximum transfer of the latent heat of steam rising from the flue pan commensurate with the requirement that it is important to prevent condensate from draining back into the flue pan. Pursuant to this requirement, at each apex of concave grooves 32 a heat resistant insulating strip 33 may be applied to minimize the tendency for steam to condense and drip from these horizontal areas. Notwithstanding the importance of minimizing such drain-back of the water to the flue pan, it is also a primary consideration that the path of the rising steam not be blocked or impeded to any substantial extent so that the steam will impinge upon the concave bottom portion of the auxiliary or upper pan for maximum transfer of heat to the sap within the pan.

Figure 2:
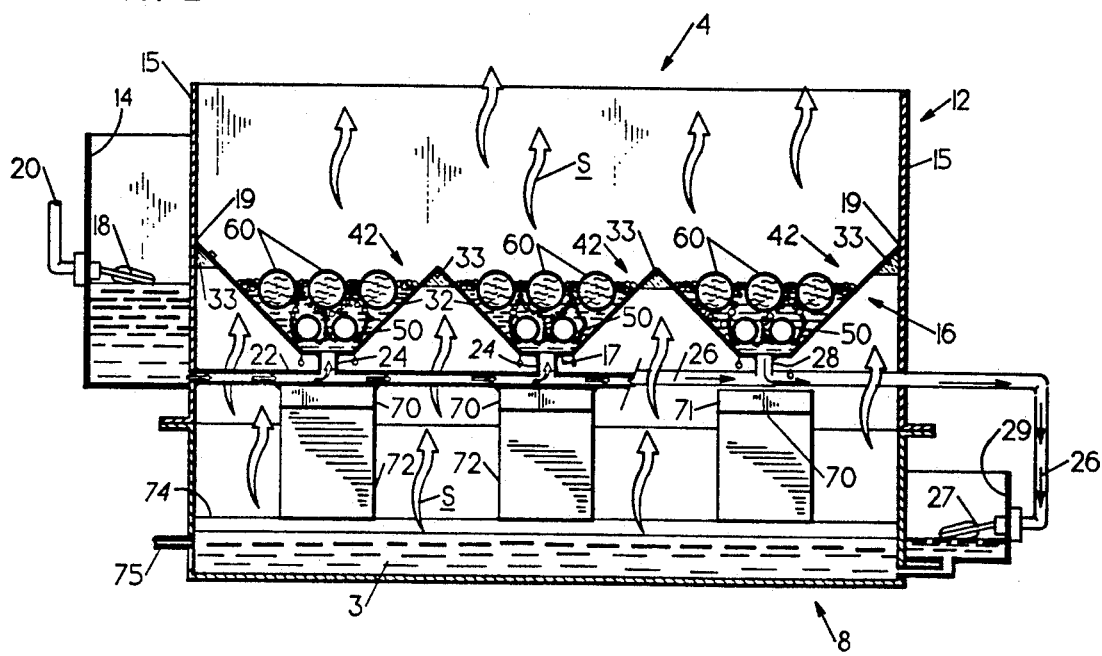
FIG. 2 is a cross-sectional view taken along line 2—2 of FIG. 1.

Maple sap within each heat exchange chamber 42, is maintained at a predetermined level by means of a regulator box 14 mounted on one of the side walls of the pan 12 which is supplied with sap from a storage tank (not shown) by a tube 20 connected to a float-type, flow control valve 18. Sap supply pipe 22 is connected at one end to the regulator box 14 and by upright portions 24 to the horizontal truncated portions 17 which form the bottom of each heat exchange chamber 42. This arrangement ensures that sap in the three chambers 42 will, by gravity feed, be maintained at proper level so that the steam pipes will be at least one-half covered or immersed in the sap before the pressurized air agitates the sap. At the opposite end of the pan 12, directly behind pipe 22 as shown in FIG. 2, an outlet pipe 26 is connected to recover sap from each chamber 42 by upright portions 28 and the pipe 26 is also connected to a second regulator box 29 which serves to maintain the level of sap in the flue pan 8 at a constant level by supplementing the same with sap drawn from the auxiliary pan 12 by pipe 26 connected to a float valve 27. Processed sap is either automatically or manually drained from the flue pan 8 through pipe 75 which in turn transfers the sap to a front pan 77 through one side thereof. When the processing of the maple sap is completed, syrup can be drained from front pan 77 through valve 79 which is located on the side of the front pan opposite from one side which receives the processed sap by way of the pipe 75.

In operation of the apparatus of this invention the flue pan and the auxiliary pan are initially filled to their required operating levels. Thereafter, additional maple sap is added from the regulator box 14 to maintain the auxiliary pan 12 at the preset level and the flue pan is, in turn, replenished by regulator box 29 from the sap which has been partially reduced in the auxiliary pan. Maple sap generally has an original sugar content of approximately 2% as it supplies to the auxiliary pan. When it is subsequently transferred from the auxiliary pan to the flue pan, the concentration has almost doubled to approximately 3½% to 4%. As the sap is boiled and its water content decreases (and its sugar concentration increases) its boiling point rises. When the boiling point reaches 7½ degrees Fahrenheit above the boiling point of water, the sap has reached its desired sugar concentration or density, which corresponds to 59 degrees Brix at 211 degrees Fahrenheit (Brix is the scale commonly used in the maple sugaring industry). At this point the processed sap becomes standard density maple syrup and is drained from the front pan 77 either manually or automatically.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

Having thus described my invention, what is claimed is:

1. An auxiliary evaporator pan adapted to be used in combination with a flue pan evaporator of an apparatus for producing maple syrup from maple sap comprising a generally ridged and grooved bottom panel, pipes disposed through said auxiliary pan, said pipes being "open" at one end to receive steam from the flue pan to heat the sap within the auxiliary pan, perforated pipes disposed below said steam pipes for injecting pressurized air into the sap to agitate the sap for simultaneous heating by the steam pipes and by steam from the flue pan which impinges on the underside of said auxiliary pan.

2. An auxiliary evaporator pan, as set forth in claim 1, in which the undersurface of said auxiliary pan is triangularly ridged at an oblique angle so that condensate which forms on said surface will have a tendency to remain on the surface as it runs downwardly toward the lower end of the undersurface disposed at said oblique angle and toward a narrow drip pan disposed under the lower end of the oblique surfaces.

3. An auxiliary evaporator pan adapted to be used in combination with a flue pan evaporator of an apparatus for producing maple syrup from maple sap comprising a generally rectangular pan adapted to be fitted in sealed, superposed relation onto the flue pan for receiving steam generated by the heating of the sap in the flue pan, said auxiliary pan having a generally triangularly ridged and grooved bottom panel comprising concave obliquely disposed panels on the underside of said bottom panel and being further defined by a generally horizontal surface extending across the lower ends of adjacent oblique panels, a drain pan disposed in vertical alignment with the horizontal surface and being inclined sufficiently to drain off condensate collected by the drain pan, pipes extending within the auxiliary pan for heating maple sap disposed therein for evaporation of the water content thereof, each of said pipes communicating at one end with a chamber opening downward to receive a substantial portion of said steam and being "open" at the opposite end into a chamber vented upwardly and having a drain for removing the condensate therefrom disposed adjacent and below said steam pipes at least one perforated pipe for injecting compressed air into the sap to agitate the sap for improved heat transfer from the steam flowing through the steam pipes in the sap and from steam contacting the underside of said bottom panel in which said sap is disposed.

* * * * *